Patented Feb. 9, 1932

1,844,390

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF ACENAPHTHYLENE

No Drawing. Application filed August 29, 1928. Serial No. 302,887.

This invention relates to processes of oxidizing acenaphthylene catalytically in the vapor phase.

Acenaphthylene, which can readily be prepared from acenaphthene by dehydrogenation, has never been oxidized catalytically, it having been assumed that such oxidations should be carried out using acenaphthene as a starting material. I have found that better and smoother results can be obtained by oxidizing acenaphthylene in the vapor phase. The amount of air or other oxygen-containing gases used and the reaction temperatures and other conditions are in general similar to those employed in the oxidation of anthracene to anthraquinone.

Acenaphthylene can be oxidized by the present invention to the various oxidation products, such as acenaphthaquinone, bisacenaphthylidenedione, naphthaldehydic acid, naphthalic anhydride, hemimellitic acid and maleic acid, by means of any of the known oxidation catalysts. The yields and purity of the products obtained are, however, very much better when catalysts or contact masses are used which contain stabilizers, that is to say compounds of the alkali forming metals, with or without stabilizer promoters, which are catalytically active components and not specific catalysts for the reaction. The oxidation of organic compounds by means of stabilized catalysts, which may or may not contain stabilizer promoters, is described and claimed generally in my Patent No. 1,709,853, dated April 23, 1929, of which the present invention is in part a continuation. It should be understood that the use of stabilized catalysts is not claimed broadly in the present application, which is restricted to the oxidation of acenaphthylene. It should be further understood that in the specification and claims the expressions "stabilizer" and "stabilizer promoter" will be used in precisely the sense in which they are employed in my co-pending application above referred to and that they are intended to have no other meaning.

While oxidation catalysts may be used generally, and stabilized catalysts with particularly good effect, desirable advantages can be obtained when the physical structure and chemical constitution of the contact masses is such as to provide high surface energy and a uniform distribution of catalytically active atoms or radicals. Especially effective contact masses possessing these advantages are those containing base exchange bodies, diluted or undiluted, silicious or non-silicious, together with their derivatives, for example the salt-like bodies obtained by causing the base exchange bodies to react with compounds containing anions capable of uniting therewith to produce salt-like bodies. The oxidation of organic compounds generally by means of base exchange contact masses and their derivatives is described and claimed generally in my Patent No. 1,694,122, dated December 4, 1928, Patent No. 1,735,763, dated November 12, 1929, and Patent No. 1,722,297, dated July 30, 1929, of which the present application is in part a continuation, it being understood, of course, that the oxidation of organic compounds generally by means of base exchange contact masses is not claimed in the present invention, which is limited to the catalytic oxidation of acenaphthylene.

When base exchange bodies are leached with acid, products are obtained which possess many of the chemical and physical characteristics of base exchange bodies. Such leached contact masses may be used for the catalytic oxidation of acenaphthylene and are described and claimed generally for the oxidation of organic compounds in my co-pending application, Serial No. 294,597, filed July 21, 1928, of which the present application is in part a continuation.

It should be understood that base exchange contact masses undergo secondary chemical, and in some cases physical, changes during catalysis or as a result of preliminary treatment, such as calcination and the like, so that the contact masses are described as of the time when freshly made as is clearly brought out in the prior applications above referred to. In the specification and claims the term "permutogenetic" covers base exchange bodies, silicious or non-silicious, the products obtained by the acid leaching of these base exchange bodies and salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

While the invention is not limited to the nature of the oxidizing gases used I have found that the best results are obtained when steam is present as a diluent of the oxygen. The presence of steam appears to smooth the reaction and gives better yields of a purer product, especially when acenaphthylene is oxidized to naphthalic anhydride. The purity of product is due in part to the faculty possessed by steam of suppressing undesired side reactions, such as, for example, the polymerization or condensation of acenaphthylene, or its lower stages of oxidation, and partly because the steam makes it possible to effect a very clean separation of naphthalic anhydride since the latter is transformed into the acid at temperatures around 140–150° C., and if the exhaust gases from the converter are cooled down to about this point practically pure naphthalic acid separates out, whereas most of the other impurities present are volatile in the presence of steam at this temperature. The use of steam in the catalytic oxidation of acenaphthylene may, therefore, be considered as the preferred embodiment of the present invention, which, however, is in no sense limited thereto.

Any of the contact masses described in my co-pending applications above referred to as suitable for use in the oxidation of acenaphthylene may be used in the present invention, and the scope of catalytically active components which can enter into the contact masses is fully discussed in said applications. In the following specific examples a few typical contact masses and reaction conditions for the oxidation of acenaphthylene will be described, it being understood that the invention is in no sense limited to the details of the contact masses described which are intended as typical illustrations only.

Example 1

18.2 parts of $V_2O_5$ are dissolved in 250 parts of potassium hydroxide solution containing 22.6 parts of KOH. 27 parts of ferric sulfate are dissolved in 300 parts of water at 50–60° C. and the potassium vanadate is then poured into the hot solution with vigorous agitation. A yellow precipitate is obtained, which is filtered by suction and washed with water until the wash water runs off colorless. The wet cake is then sludged in 200 parts of water and the suspension coated uniformly onto 500 volumes of 8–12 mesh pumice fragments, preferably by spraying the suspension onto the carrier material, which is agitated and heated to a temperature at which the water of the suspension is immediately vaporized on striking the carrier. In this manner a very uniform coating is obtained.

The contact mass is then filled into a suitable converter, for example a tubular converter using a boiling bath, such as boiling mercury alloys as a temperature controlling means, an example being a bath containing 30 parts of mercury and 70 parts lead, tube diameters being ¾" and contact mass height 9–12". Acenaphthylene is uniformly vaporized into an air stream, preferably containing steam, in the ratio of 1:30 by weight and passed over the contact mass at 370–400° C. Good yields of naphthalic anhydride are obtained, the product being practically chemically pure and usable as a dyestuff intermediate without further purification.

Instead of using vanadium in the contact mass, other elements, particularly metal elements of the fifth and sixth groups of the periodic system, may be used singly or in admixture. Examples are molybdenum tungsten, uranium or chromium. The iron salt may also be partly or entirely replaced by one or more of the following bases:—cobalt, nickel, copper, silver, aluminum, titanium, zirconium, manganese or cerium.

Instead of using pumice fragments as a carrier, quartz fragments, quartz filter stone fragments, sand stones, "Celite" brick fragments, or natural or artificial silicates, base exchange bodies, especially zeolites made by fusion or wet methods and preferably diluted with material rich in silica, metal granules such as aluminum granules, granules of metal alloys such as ferrosilicon, ferrovanadium, and the like, may be used, the granule size being preferably the same as for pumice. Some of these modified contact masses produce more or less hemimellitic acid in addition to the naphthalic anhydride. The acid may be readily removed by solution in water and can be recovered and used.

Example 2

Suspensions are prepared as in Example 1, and 20–35 parts of $K_2SO_4$ are dissolved to act as a stabilizer for the contact mass. The stabilized suspension is then coated onto the carriers as described in Example 1. The potassium sulfate may also be substituted by one or more other metals, especially the elements of the first and second groups of the periodic system, such as potassium nitrate, potassium nitrite, potassium bisulfate, potassium chloride, potassium bromide, calcium sulfate, magnesium sulfate or corresponding compounds of lithium, sodium, rubidium, caesium, strontium.

The stabilized contact masses are filled into a converter as described in Example 1 and acenaphthylene, uniformly vaporized with air in the proportion of 1:25 by weight, is passed over the contact mass at 380–400° C., producing a naphthalic anhydride of high purity with yields up to 80% of theory, which are considerably higher than can be obtained with the unstabilized contact mass described in Example 1. At somewhat lower temperatures, acenaphthaquinone and other intermediate products are obtained, such as naphthaldehydic acid, bisacenaphthylidenedione, etc. The oxidation, whether at high or low temperatures, proceeds more smoothly and regularly with the stabilized contact mass.

*Example 3*

1,000 parts of a natural base exchange body or a diluted or undiluted artificial base exchange body made by wet or fusion methods, such as those available in the trade for water softening purposes, as treated with 5–10% solutions of one or more metal salts, such as ferric sulfate, cobalt nitrate, nickel sulfate, copper sulfate, silver nitrate, aluminum sulfate, manganese sulfate, vanadyl sulfate, or chromium nitrate until a maximum of exchangeable alkali has been replaced by base exchange. Preferably the exchange may be effected by trickling the solutions over the base exchange bodies at 40–50° C. After base exchange has been carried out, the products are treated with water soluble compounds of the metal acids of the fifth and sixth groups of the periodic system, such as ammonium vanadate or ammonium molybdate, in order to form the so-called salt-like body of the base exchange body. The salt-lake bodies are then calcined with 7% $SO_2$ gases or a corresponding amount of gases containing $SO_3$ at 400–500° C and are then filled into a converter as described in Example 1.

Acenaphthylene uniformly vaporized with air which has been bubbled through hot water in a ratio, for example, of 1:35 by weight is passed over the contact mass at 370–420° C., resulting in good yields of naphthalic anhydride of high purity. The reaction conditions, such as the temperature, time of contact, loading, concentration of acenaphthylene in reaction gases, and oxygen content, may be varied within wide limits, and in addition a certain amount of diluent gases, such as carbon dioxide, nitrogen, and steam may also be used. The steam is particularly effective in the production of naphthalic anhydride from acenaphthylene, especially where naphthalic anhydride is accompanied by other intermediate products, such as acenaphthaquinone, or small amounts of acenaphthylene. These impurities are very volatile with steam and can, therefore, be separated from the naphthalic anhydride by fractional condensation of the converter exhaust gases. Instead of introducing steam into or forming steam in the gas stream before it passes through the converter, steam may also be introduced into the exhaust gases, resulting in an effective separation of the reaction products and permitting the production of a naphthalic anhydride which is practically chemically pure. Instead of using converters provided with boiling baths as temperature regulating means, so-called automatic gas cooled converters in which the reaction gases pass through heat exchange elements embedded in a contact mass layer, preferably heat exchange elements of the double counter current heat exchange type, may also be used with or without recirculation of part of the reaction products. High yields of naphthalic anhydride may be obtained in such converters, which are considerably cheaper to build than those using metal baths.

*Example 4*

200 parts of 33° Bé. potassium waterglass solution are diluted with 6–8 volumes of water and then mixed with sufficient kieselguhr or "Celite" brick refuse so that the suspension just remains easily stirrable. 18 parts of $V_2O_5$ are reduced to a blue vanadyl sulfate in a hot aqueous solution acidified with $H_2SO_4$, using sulfur dioxide in the usual way. The vanadyl sulfate thus formed is then transformed into a brown solution of potassium vanadite by use of sufficient 10 N. caustic potash solution. A 5–10% solution is prepared containing a mixture of ferrous sulfate and manganese sulfate in the ratio of 3:1. The waterglass and vanadite solutions are poured together and sufficient of the iron-manganese sulfate solution is added in a thin stream with vigorous agitation until the reaction mixture is neutral to phenolphthalein or is just alkaline. The reaction mass solidifies to a dirty green gel, which is filtered with suction, washed three times with 100 volumes of water and dried.

Instead of suspending the diluent in the waterglass solution, it may be supended in the vanadite solution or in a mixture of the waterglass and vanadite solution. The products are equally effective. The vanadite solution may also be partly or wholly replaced by corresponding amounts of a potassium vanadate solution obtained by dissolving $V_2O_5$ in a 2 N. caustic potash solution or other metallates of the fifth and sixth groups of the periodic system, such as potassium tungstate may be used. The iron and manganese sulfates may also be partly or wholly replaced by salts of one or more of the following metals:—copper, nickel, cobalt, iron or aluminum.

After the base exchange bodies have been dried, preferably at 100° C., they may be subjected to base exchange or to the formation of salt-like bodies as described in the foregoing example. In such a case it is desirable to first hydrate the dried base exchange body by trickling water over it.

Among the elements which may replace part or all of the exchangeable alkali are salts of iron, cobalt, silver, nickel and cerium which may be introduced by causing 5–10% solutions to repeatedly trickle over the base exchange body at room or somewhat elevated temperatures.

The contact masses described are alkaline in character and when naphthalic anhydride is to be obtained it is desirable to neutralize this alkalinity. This may be easily effected by spraying the fragments with diluted 10% sulfuric or nitric acid in amounts sufficient so that when a sample is diluted or leached with water no alkaline reaction will be apparent. After the contact mass has been filled into a converter, acenaphthylene of various grades of purity, for example obtained by the catalytic dehydrogenation of crude acenaphthene is uniformly vaporized with air in the ratio of 1:20–30 parts by weight and passed over the contact mass at 380–410° C. Naphthalic anhydride of high purity is obtained in good yields, the accompanying impurities in the acenaphthylene being entirely burned out or transformed into compounds of acid character, such as phthalic anhydride, maleic acid, etc. which can be easily separated from the naphthalic anhydride by reason of their solubility in water. It is frequently advantageous to use steam in addition to air, or to use moist air.

This example ably demonstrates the effectiveness of the invention as it is not necessary to use purified raw material as has hitherto been considered essential in the oxidation of acenaphthene. On the contrary, a crude acenaphthylene obtained by the dehydrogenation of crude acenaphthene can be readily used. This is an important advantage of the process as, of course, crude raw materials are very much cheaper than highly purified raw materials. Instead of neutralizing the alkalinity of the base exchange contact masses by spraying the fragments with acid, they may be leached by trickling dilute acid over them, the leaching preferably being stopped before all of the exchangeable bases have been removed. These leached base exchange bodies are very effective contact masses under the reaction conditions described above.

Example 5

The following mixtures are prepared:

(1) 22 parts of aluminum sulfate with 18 mols of water are dissolved in 150 parts of water and the aluminum hydroxide is precipitated with ammonia. Thereupon the precipitate is washed with 150–200 parts of water.

(2) 12 parts of $V_2O_5$ are dissolved in 5 N. KOH solution containing 24 parts of 100% KOH, the solution taking place at 80–90° C.

(3) The aluminum hydroxide from (1) is mixed with the potassium vanadate solution with vigorous agitation to obtain a milky paste.

(4) 60 parts of "Celite" brick refuse are suspended in 250 parts of water and 8 parts of ferric sulfate are added to the suspension, ferric hydroxide being then precipitated by means of 2/N KOH. The cake obtained is carefully washed free from the mother liquor.

The milky paste obtained in (3) is intimately kneaded with the cake obtained in (4) and then thoroughly mixed with 25 parts of 33° Bé. potassium waterglass. After the mixture is complete, the material is placed on a suction filter and washed with 100 parts of water, followed by drying the cake, preferably at temperatures below 100° C., and it is then broken into fragments. The granular material obtained is then impregnated in installments with 100% sulfuric acid, the product being dried after each impregnation. A so-called salt-like body is produced which is then filled into a converter.

80% crude acenaphthylene, obtained, for example, by dehydrogenation or cracking of crude acenaphthene, is uniformly vaporized into an air stream, with or without steam, in the ratio of 1:25 by weight and passed over the contact mass at 370–400° C. Naphthalic anhydride is obtained containing some hemimellitic acid, maleic acid and naphthaldehydic acid.

Example 6

14 parts of $V_2O_5$ are dissolved in a potassium hydroxide solution to form potassium vanadate. The solution contains 200 parts of water. 9.5 parts of sodium tungstate are dissolved in 35 parts of water and then mixed with potassium vanadate and a sufficient amount of hydrochloric acid is added so that the solution just remains slightly alkaline to litmus. Thereupon the solution is diluted with 600–700 parts of water and 70–95 parts of commercial waterglass diluted with an equal volume of water are added with vigorous agitation, the mixture being heated up to 60–70° C. Thereupon diluted hydrochloric acid is added in small portions from time to time, care being taken that the reaction remains distinctly alkaline to litmus. The gelatinous precipitate obtained is pressed free from the mother liquor, dried and hydrated with water in the usual manner. It is a base exchange body containing vanadium and tungsten in non-exchangeable form. The product is then treated by trickling a 5% manganese chloride solution over it in order to replace part of the exchangeable alkali by manganese oxide. Thereupon the product is treated with diluted nitric acid and filled into a converter.

Various grades of acenaphthylene are vaporized into oxidizing gases with or without steam and passed over the contact mass at 320–400° C., and various intermediate products, such as acenaphthaquinone, bisacenaphthylidenedione, naphthalic anhydride, hemimellitic acid, and maleic acid are obtained, the relative amounts depending on the nature of the crude acenaphthylene used and on the reaction conditions, including the amount of steam present. When the gases used have a low oxygen content or lower reaction temperatures are used, the primary oxidation products, that is to say the quinones and naphthaldehydic acid, are obtained in better yields, but some naphthalic anhydride is always obtained as this product appears to be the most stable. Where the temperature is kept low and the oxygen content is maintained at a point to favor the production of the quinones and diketones, the contact masses do not have to be neutralized as alkaline contact masses, which are unsatisfactory for the production of acidic compounds, are entirely satisfactory and in some cases give better results in the production of quinones and similar nonacidic carbonyl compounds.

*Example 7*

18 parts of $V_2O_5$ are suspended in 200 parts of water acidified with concentrated sulfuric acid and then are reduced to vanadyl sulfate with ordinary reducing agents, such as sulfur dioxide. The solution is then boiled and concentrated to 150 volumes. 10 parts of aluminum oxide in the form of the freshly precipitated hydroxide are transformed into potassium aluminate by 5 N. potassium hydroxide solution. One-third of the vanadyl sulfate solution is treated with 10 N. potassium hydroxide and transformed into the coffee brown vanadite, which is then mixed with the potassium aluminate solution and 100 parts of infusorial earth are stirred in. The remaining two-thirds of the vanadyl sulfate solution is then added with vigorous agitation, the product pressed, dried, broken into fragments and hydrated for a considerable time with water and then digested with a 5% copper sulfate solution, substituting the exchangeable alkali by copper. The base exchange body, which is a so-called three-component zeolite, is then broken into suitable fragments, calcined with 3–4% burner gases at 450° C. and filled into a converter.

90% acenaphthylene is uniformly vaporized into an air stream, with or without steam, in the proportion of 1:25 by weight and passed over the contact mass at 360–400° C. Good yields of naphthalic anhydride of high purity are obtained.

*Example 8*

21.5 parts of ferric chloride are dissolved in 300 parts of water and 80 parts of infusorial earth are stirred in. The suspension is heated to 40–50° C. and a potassium vanadate solution containing 18.8 parts of $V_2O_5$ and 22.6 parts of KOH in 250 parts of water is added with vigorous agitation. The infusorial earth is thereby uniformly impregnated with ferric vanadate, and after filtration is washed with 250 parts of cold water. 90.5 parts of 33° Bé. waterglass are diluted with 4–5 volumes of water and the impregnated filter cake is then added with vigorous agitation in order to effect a uniform distribution. 60 parts of aluminum sulfate with 18 mols of water are dissolved in 200 parts of water and 10 N. potassium hydroxide solution is then added to dissolve up the aluminum hydroxide which is at first precipitated. The potassium aluminate solution obtained is then stirred into the waterglass suspension and the mixture heated up to 90° C. A gelatinous precipitate is obtained almost at once and is increased by the gradual addition of sufficient 2 N. sulfuric acid, care being taken that a weak alkalinity to phenolphthalein is maintained. The stirring is continued for an hour, the mixture being permitted to gradually cool to room temperature. Then the gelatinous precipitate is pressed, washed with 200 parts of water in small portions, dried at 100° C. and broken into suitable fragments, which are filled into a converter. Before using, the contact mass should be treated with 4–60% burner gases at 450–500° C. and then blown with air.

Instead of using iron vanadate as a diluent in the zeolite, other catalytically active salts of vanadium and other metal acids of the fifth and sixth groups of the periodic system may be used. Such salts, for example, are those of nickel, cobalt, manganese, copper, aluminum, titanium, silver, barium, or calcium. A single salt may be used or a mixture of two or more may be used.

The contact mass above described, in which the zeolite acts as a carrier for the catalytically active diluents may be coated on or impregnated into massive carriers of natural or artificial origin, such as materials rich in $SiO_2$, for example roughened quartz fragments, flints, pumice fragments, broken quartz filter stone, artificial carriers formed from kieselguhr and waterglass, kieselguhr and potassium sulfate, kieselguhr and alkalies or alkali metal salts. Metal or metal alloy carriers may also be used, such as aluminum granules, roughened granules of ferrovanadium, ferromolybdenum, ferrosilicon, silicon ferromanganese, silicon aluminum ferromanganese, ferrotitanium, ferrotungsten, and the like. These contact masses can either be prepared by causing the waterglass suspension to adhere to the carrier and then forming the zeolite by adding the aluminate solution, or by spraying with an aluminum sulfate solution, in which case a zeolite is produced of the aluminum double silicate type.

Acenaphthylene of various grades of purity is vaporized in an air stream in the ratio of 1:20 by weight and passed over the contact mass at 340–410° C. Naphthalic anhydride of high purity is obtained.

In one of the examples the leaching of one of the base exchange bodies has been referred to and it should be understood that excellent contact masses, especially for the production of naphthalic anhydride, may be prepared by leaching other base exchange contact masses, such as those described in some of the other examples with dilute acid, for example ½ to 1% acid solutions, which are permitted to trickle over the base exchange bodies. The products are dried before use.

What is claimed as new is:

1. A method of oxidizing acenaphthylene, which comprises vaporizing it and passing the vapors admixed with an oxidizing gas over a contact mass containing at least one catalyst known to effect the oxidation of acenaphthene to naphthalic anhydride maintained at reaction temperatures.

2. A method of oxidizing acenaphthylene, which comprises vaporizing it and passing the vapors admixed with an oxidizing gas over a contact mass containing at least one metal element of the fifth or sixth groups of the periodic system maintained at a reaction temperature.

3. A method of oxidizing acenaphthylene, which comprises vaporizing it and passing the vapors admixed with an oxidizing gas over a contact mass which contains a compound of an element included in the group consisting of alkali metals and alkaline earth metals maintained at a reaction temperature.

4. A method of oxidizing acenaphthylene, which comprises vaporizing it and passing the vapors admixed with an oxidizing gas over a contact mass containing a compound of an element included in the group consisting of alkali metals and alkaline earth metals and also containing at least one metal element of the fifth or sixth groups of the periodic system maintained at a reaction temperature.

5. A method of oxidizing acenaphthylene, which comprises vaporizing the acenaphthylene, admixing the vapors with an oxidizing gas and passing them at a reaction temperature over a contact mass containing a permutogenetic body.

6. A method of oxidizing acenaphthylene, which comprises vaporizing the acenaphthylene, admixing the vapors with an oxidizing gas and passing them at a reaction temperature over a contact mass containing a permutogenetic body, said contact mass containing at least one metal element of the fifth or sixth groups of the periodic system.

7. A method of oxidizing acenaphthylene, which comprises vaporizing the acenaphthylene, admixing the vapors with an oxidizing gas and passing them at a reaction temperature over a contact mass containing a diluted permutogenetic body.

8. A method of oxidizing acenaphthylene, which comprises vaporizing the acenaphthylene, admixing the vapors with an oxidizing gas and passing them at a reaction temperature over a contact mass containing a diluted permutogenetic body, said contact mass containing at least one metal element of the fifth or sixth groups of the periodic system.

9. A method of oxidizing acenaphthylene, which comprises vaporizing it and passing the vapors admixed with an oxidizing gas over a vanadium containing contact mass maintained at a reaction temperature.

10. A method of oxidizing acenaphthylene, which comprises vaporizing it and passing the vapors admixed with an oxidizing gas over a vanadium containing contact mass which contains a compound of an element included in the group consisting of alkali metals and alkaline earth metals maintained at a reaction temperature.

11. A method of oxidizing acenaphthylene, which comprises vaporizing the acenaphthylene, admixing the vapors with an oxidizing gas and passing them at a reaction temperature over a vanadium containing contact mass containing a permutogenetic body.

12. A method of oxidizing acenaphthylene, which comprises vaporizing the acenaphthylene, admixing the vapors with an oxidizing gas and passing them at a reaction temperature over a vanadium containing contact mass containing a diluted permutogenetic body.

13. A method of oxidizing acenaphthylene to naphthalic anhydride, which comprises vaporizing acenaphthylene, admixing the vapors with an oxidizing gas and passing them over a non-alkaline contact mass containing at least one catalyst known to effect the oxidation of acenaphthene to naphthalic anhydride maintained at reaction temperatures.

14. A method of oxiding acenaphthylene, which comprises vaporizing the acenaphthylene, admixing the vapors with an oxidizing gas and steam and passing them at reaction temperatures over a contact mass containing at least one catalyst known to effect the oxidation of acenaphthene to naphthalic anhydride.

15. A method of oxidizing acenaphthylene to naphthalic anhydride, which comprises vaporizing the acenaphthylene, admixing the vapors with an oxidizing gas and steam and passing them at reaction temperatures over a non-alkaline contact mass containing at least one catalyst known to effect the oxidation of acenaphthene to naphthalic anhydride.

16. A method of oxiding acenaphthylene, which comprises vaporizing the acenaphthylene, admixing the vapors with an oxidizing gas and steam and passing them at a reaction temperature over a contact mass containing vanadium.

17. A method of oxidizing crude acenaphthylene which comprises vaporizing the crude acenaphthylene, admixing the vapors with an oxidizing gas and passing them at a reaction temperature over a contact mass which favors the production of naphthalic anhydride.

18. A method of oxidizing crude acenaphthylene, which comprises vaporizing the crude acenaphthylene, admixing the vapors with an oxidizing gas and passing them at a reaction temperature over a contact mass which contains a compound of an element included in the group consisting of alkali metals and alkaline earth metals.

19. A method of oxidizing crude acenaphthylene, which comprises vaporizing the crude acenaphthylene, admixing the vapors with an oxidizing gas and passing them at reaction temperatures over a non-alkaline contact mass containing at least one catalyst known to effect the oxidation of acenaphthene to naphthalic anhydride.

20. A method of oxidizing crude acenaphthylene, which comprises vaporizing the crude acenaphthylene, admixing the vapors with an oxidizing gas and passing them at a reaction temperature over a contact mass containing at least one metal element of the fifth or sixth groups of the periodic system.

Signed at Pittsburgh, Pennsylvania, this 27th day of August, 1928.

ALPHONS O. JAEGER.